United States Patent
Ikeda

(10) Patent No.: US 11,175,863 B2
(45) Date of Patent: Nov. 16, 2021

(54) IMAGE PROCESSING APPARATUS, LEARNING APPARATUS, IMAGE PROCESSING METHOD, LEARNING METHOD, AND STORAGE MEDIUM FOR ESTIMATING PRINTING RESULT

(71) Applicant: CANON KABUSHIKI KAISHA, Tokyo (JP)

(72) Inventor: Satoshi Ikeda, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/855,528

(22) Filed: Apr. 22, 2020

(65) Prior Publication Data

US 2020/0371725 A1 Nov. 26, 2020

(30) Foreign Application Priority Data

May 21, 2019 (JP) .............................. JP2019-095480

(51) Int. Cl.
*G06F 3/12* (2006.01)
*G06N 3/08* (2006.01)
*G06N 3/04* (2006.01)

(52) U.S. Cl.
CPC ......... *G06F 3/1208* (2013.01); *G06N 3/0454* (2013.01); *G06N 3/08* (2013.01); *G06F 3/1205* (2013.01); *G06F 3/1256* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,309,525 A * | 5/1994 | Shimomura | ......... | G06N 3/0454 382/157 |
| 5,774,230 A * | 6/1998 | Goto | ...................... | H04N 1/603 358/518 |
| 7,481,509 B2 * | 1/2009 | Staelin | ................. | G03G 15/065 347/14 |
| 2007/0291289 A1* | 12/2007 | Kuo | ..................... | H04N 1/6055 358/1.9 |

FOREIGN PATENT DOCUMENTS

JP 2006259393 A 9/2006

* cited by examiner

*Primary Examiner* — Barbara D Reinier
(74) *Attorney, Agent, or Firm* — Carter, DeLuca & Farrell LLP

(57) ABSTRACT

The technique of the present disclosure provides an image processing apparatus for estimating a printing result of image data to be printed with a small amount of operation after the image data is obtained. The apparatus is an image processing apparatus for estimating a printing result to be obtained by printing input image data with a printer, including: an obtaining unit that obtains the input image data; and an estimation unit that estimates the printing result based on the input image data. The estimation unit has been caused to learn scanned image data as correct data, the scanned image data being obtained by reading, with a scanner, a printing result obtained by printing predetermined image data with the printer.

17 Claims, 15 Drawing Sheets

IMAGE PROCESSING APPARATUS, LEARNING APPARATUS, IMAGE PROCESSING METHOD, LEARNING METHOD, AND STORAGE MEDIUM FOR ESTIMATING PRINTING RESULT

BACKGROUND OF THE INVENTION

Field of the Invention

The technique of the present disclosure relates to a technique for estimating a printing result to be printed with a printer.

Description of the Related Art

In recent years, a variety of simulation techniques for estimating printed image quality without performing actual printing have been developed. Techniques for simulating an entire printed image printed on a print material as image data have also been developed. In Japanese Patent Laid-Open No. 2006-259393, an electrophotographic printing process is simulated based on detailed physical models to estimate the printed image.

However, a problem with the estimation of a printing result based on physical simulation of a printing process is that it requires a significant amount of operation. Hence, in an environment with a limited operation resource, the physical simulation takes time, making it difficult to implement an application required to perform a real-time operation, such as presenting printed image quality to the user before printing, for example.

In view of the above, an object of the technique of the present disclosure is to estimate a printing result of image data to be printed with a small amount of operation after the image data is obtained.

SUMMARY OF THE INVENTION

The technique of the present disclosure provides an image processing apparatus for estimating a printing result to be obtained by printing input image data with a printer, including: an obtaining unit that obtains the input image data; and an estimation unit that estimates the printing result based on the input image data, in which the estimation unit has been caused to learn scanned image data as correct data, the scanned image data being obtained by reading, with a scanner, a printing result obtained by printing predetermined image data with the printer.

Further features of the present invention will become apparent from the following description of exemplary embodiments with reference to the attached drawings.

DESCRIPTION OF THE EMBODIMENTS

Embodiment 1

In embodiment 1, a description will be given of an image processing apparatus that estimates a printing result to be printed based on a modeling-target printer and print medium with an estimation unit using two neural networks. Note that in the present disclosure, a printing result is an image printed on a print medium.

Generally, an image, i.e., a printing result, printed on a print medium by a printer has random scattering or bleeding of a color material, such as toner or ink, unique to the type of the printer and the type of the print medium. Thus, edges in the printing result meander and blur due to the random scattering or bleeding of the color material. In a case where a single neural network is used to simulate scanned image data of such a printing result, estimated image data with a strong blur than that of the actual scanned image data will be outputted.

To solve this, in the present embodiment, a printing result is estimated with two different estimation units connected in series. The estimation unit at the first stage outputs intermediate data being image data indicating regions on a print medium surface where a color material is applied at a predetermined density or higher, and reproducing the scattering or bleeding of the color material. The estimation unit at the second stage outputs estimated image data representing a printing result estimated from the intermediate data outputted from the estimation unit at the first stage, which the intermediate data reproduces the gradations, i.e., blurs, around edges resulting from the change in the density of the color material. In this manner, estimated image data representing a printing result is outputted with higher accuracy and at higher speed.

<Configuration of Image Processing Apparatus>

Figure 1:
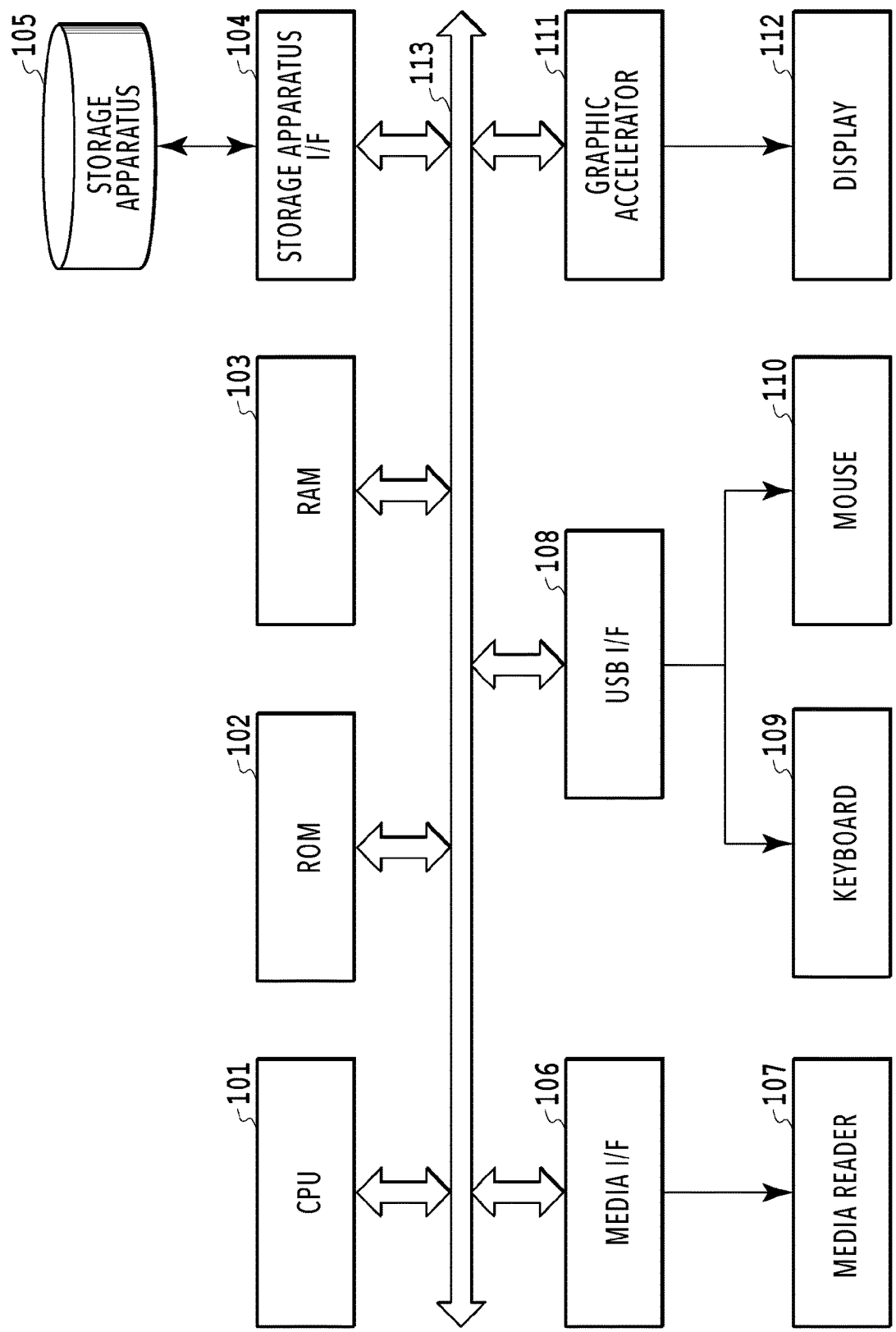
FIG. 1 is a schematic diagram showing a configuration of a system including an image processing apparatus in the present disclosure.

FIG. 1 is a block diagram showing a configuration of an image processing apparatus in the technique of the present disclosure. A CPU 101 executes an operating system (OS) and various programs stored in a ROM 102 and a storage apparatus 105, such as a hard disk drive (HDD), by using a RAM 103 as a work memory. Then, the CPU 101 controls components through a system bus 113, such as a peripheral component interconnect (PCI) bus. Further, the CPU 101 executes various programs including a later-described depth information processing program and media reader driver.

The CPU 101 is capable of accessing the storage apparatus 105 through the system bus 113 and a storage apparatus interface 104. A storage apparatus interface (I/F) 104 is an interface such as a serial ATA (SATA), for example, which connects the storage apparatus 105 and a secondary storage apparatus, such as an optical disk drive. The CPU 101 is capable of reading data from the storage apparatus 105 and writing data to the storage apparatus 105 through the storage apparatus I/F 104. Also, the CPU 101 displays a user interface for a later-described process and the result of the process on a display 112 through a graphic accelerator 111. Further, the CPU 101 receives instructions from the user through input apparatuses such as a keyboard 109 and a mouse 110 connected to a USB interface (I/F) 108

<Process in Image Processing Apparatus>

Figure 2:
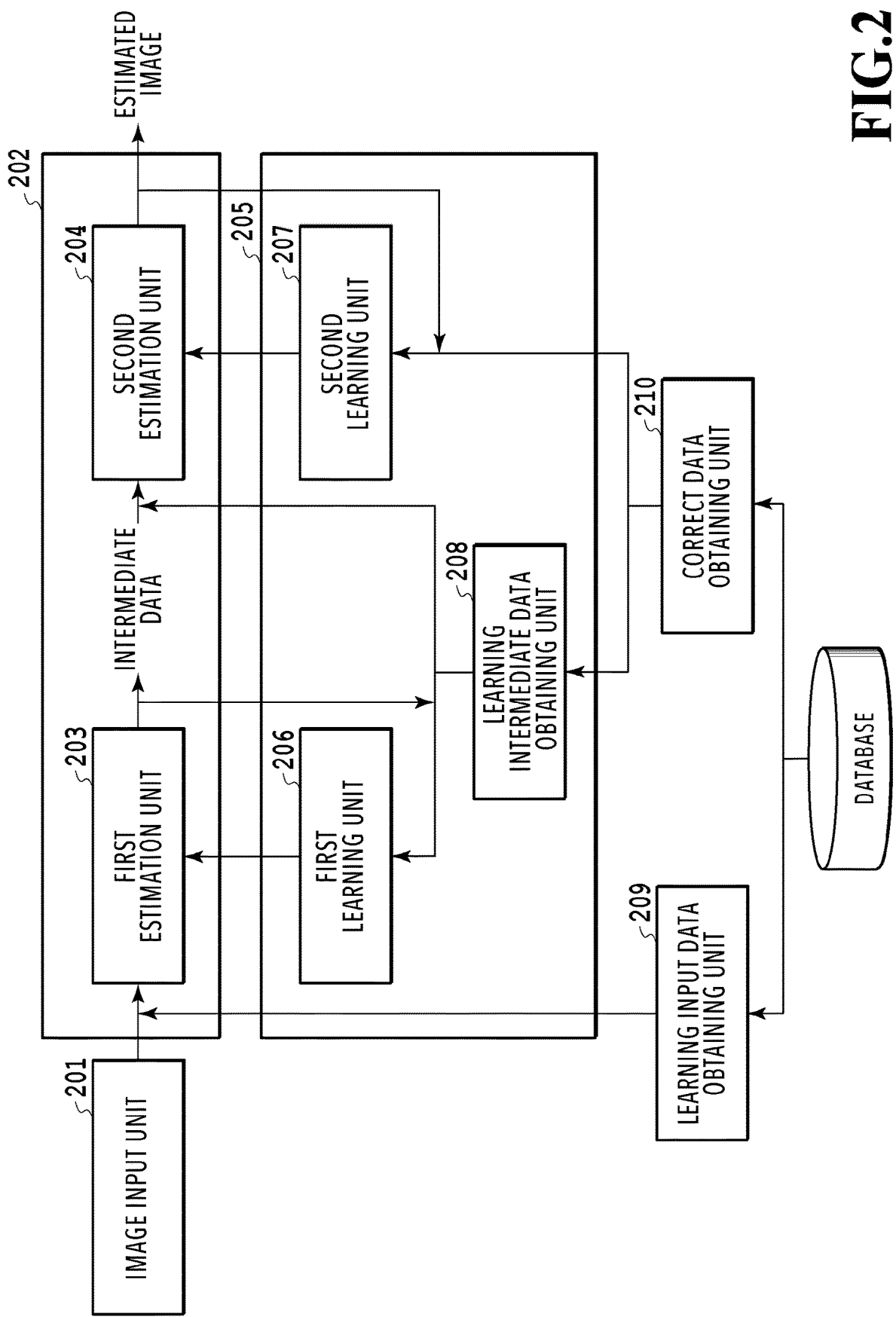
FIG. 2 is a block diagram showing processing steps in the image processing apparatus in the present disclosure.

FIG. 2 is a block diagram showing process in the present embodiment. First, input image data is obtained at an image input unit 201. From the input image data obtained at the image input unit 201, an image estimation processing unit 202 estimates scanned image data of a printing result to be printed with a particular modeling-target printer and print medium. The input image data inputted into the image estimation processing unit 202 is 1-bit monochrome image data obtained by performing halftoning on multi-tone image data. Here, multi-tone image data is image data with a greater number of tone levels than that of binary image data. Also, the estimated image data outputted as an estimation result from the image estimation processing unit 202 is 8-bit monochrome image data equivalent to scanned image data generated by reading the printing result printed with the printer with a scanner.

In the present embodiment, the image estimation processing unit 202 includes therein a first estimation unit 203 and a second estimation unit 204. The first estimation unit 203 receives 1-bit per pixel input image data and outputs intermediate data. Here, the intermediate data outputted from the first estimation unit 203 is 1-bit per pixel image data, like the input image data, and is binary image data reproducing the state of scattering or bleeding of the color material in the printing with the printer. Details of the intermediate data will be described later. From the 1-bit per pixel intermediate data, the second estimation unit 204 outputs 8-bit per pixel estimated image data. A learning unit 205 learns internal parameters of the first estimation unit 203 and the second estimation unit 204.

In the present embodiment, the tone of the input image data is 1 bit, the tone of the intermediate data is 1 bit, and the tone of the estimated image data is 8 bits. Note, however, that the technique of the present disclosure is not limited to these. In an example, the tone of the input image data may be 2 bits, the tone of the intermediate data may be 2 bits, and the tone of the estimated image data may be 16 bits.

The learning unit 205 includes a first learning unit 206, a second learning unit 207, and a learning intermediate data obtaining unit 208. The first learning unit 206 causes the first estimation unit 203 to learn the weights of layers in a neural network, which are its internal parameters. Likewise, the second learning unit 207 causes the second estimation unit 204 to learn the weights of layers in a neural network, which are its internal parameters.

A learning input data obtaining unit 209 obtains a learning input image data set from a database. A correct data obtaining unit 210 obtains from the database a scanned image data set obtained by printing the learning input image data set with the modeling-target printer and reading each printing result with the scanner. Note that the learning input image data set and the scanned image data set to be used by the learning unit 205 are stored in advance in the database such that each piece of learning input image data and the piece of scanned image data generated by using the piece of learning input image data are associated with each other. As for the method of associating each piece of learning input image data and the corresponding piece of scanned image data, common identification information may be written in their metadata, and the piece of learning input image data and the corresponding piece of scanned image data may be associated based on this identification information, for example. Note that the learning input image data set is a plurality of pieces of binary image data obtained by performing halftoning on a plurality of pieces of arbitrary multi-tone image data, and the plurality of pieces of arbitrary image data desirably include pieces of image data with different numbers of tone levels. In an example, pieces of natural image data on which halftoning has been performed may be used as the pieces of learning input image data.

The learning intermediate data obtaining unit 208 generates a learning intermediate data set from the scanned image data set obtained by the correct data obtaining unit 210. The first learning unit 206 performs parameter learning by using the learning input image data set obtained by the learning input data obtaining unit 209 and the learning intermediate data set obtained by the learning intermediate data obtaining unit 208. The second learning unit 207 performs parameter learning by using the learning intermediate data set obtained by the learning intermediate data obtaining unit 208 and the scanned image data set obtained by the correct data obtaining unit 210.

Note that the image estimation processing unit 202 and the learning unit 205 may operate as a single apparatus or operate as separate apparatuses. In an example, the image estimation processing unit 202 and the learning unit 205 may be configured as separate apparatuses such that the learning unit 205 learns the internal parameters of the image estimation processing unit 202 in advance and only the image estimation processing unit 202 is used at the time of estimating an image. Also, although the output of the learning input data obtaining unit 209 is inputted into the first estimation unit 203 through the learning unit 205, the configuration may be such that the output is inputted directly into the first estimation unit 203 without passing through the learning unit 205.

Figure 3A:
FIG. 3A is a schematic diagram showing input data.
Figure 3B:
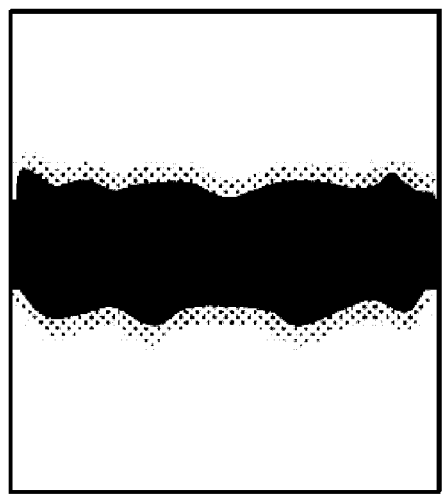
FIG. 3B is a schematic diagram showing scanned image data.
Figure 3C:
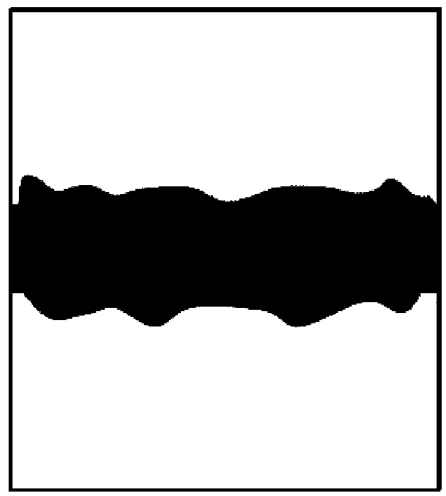
FIG. 3C is a schematic diagram showing intermediate data.

FIGS. 3A to 3C are schematic diagrams showing the relationship between input image data, intermediate data, and scanned image data. FIG. 3A is a diagram showing input image data being binary image data formed solely of black and white. FIG. 3B is scanned image data obtained by printing the input image data shown in FIG. 3A and reading it with the scanner. In FIG. 3B, the edges of the line meander due to the scattering or bleeding of the color material in the printing process with the printer. Also, the input image data in FIG. 3A is a binary image and therefore formed solely of black and white pixels, whereas the scanned image data in FIG. 3B is 256-tone image data and therefore contains gray pixels and is blurred around the edges of the line. FIG. 3C is intermediate data generated by binarizing the scanned image data in FIG. 3B. The black pixel regions in FIGS. 3B and 3C have the same outline shape, and FIG. 3C represents data obtained by extracting only information on the positions of the pixels having pixel values of a predetermined value or more from the scanned image data in FIG. 3B and omitting information on the gradations of the color material.

In a case where a model that directly estimates the scanned image data in FIG. 3B from the input image data in FIG. 3A is constructed, the estimated image data to be outputted will be image data more blurred than the actual scanned image data. This is because the meanderings of the edges in FIG. 3B originate from the scattering or bleeding of the color material and occur randomly. In a case where learning is performed to output estimation results of such random edge meanderings in the form of multi-tone image data, values obtained by averaging the random components of the edge meanderings will be written as gray values in the image data. Thus, if a single estimation unit is caused to learn estimation of edge meanderings and estimation of edge blurring, a model that outputs image data containing blurs originating from edge meanderings and being more blurred than the scanned image data will be learned.

In the present embodiment, scanned image data is estimated by estimating edge meanderings and estimating edge blurring with two separate estimation units. This enables improvement in estimation accuracy while keeping the learning cost low.

The first estimation unit 203 learns a model that receives input image data as shown in FIG. 3A and outputs intermediate data as shown in FIG. 3C. The model that converts the 1-bit per pixel input image data shown in FIG. 3A into the 1-bit per pixel intermediate data in FIG. 3C contains random edge changes originating from the scattering or bleeding of the color material. Here, the intermediate data outputted from the first estimation unit 203 is binary image data and does not have tones to express the gradations of the color material. Hence, the estimation by the first estimation unit 203 can be said to include no estimation of the blurs in the image originating from the gradations of the color material.

The second estimation unit 204 learns a model that receives intermediate data as shown in FIG. 3C and estimates scanned image data of a printing result having an 8-bit tone per pixel as shown in FIG. 3B. In FIGS. 3B and 3C, the pixel groups with the lowest (black) pixel value have the same outline, and the edges are therefore not changed. That is, the estimation by the second estimation unit 204 hardly includes an estimation of the random edge changes originating from the scattering or bleeding of the color material. This enables image conversion from binary intermediate data into a multi-value scanned image that reproduces blurs equivalent to those in the actual image.

<Configuration of First Estimation Unit 203>

Figure 4:
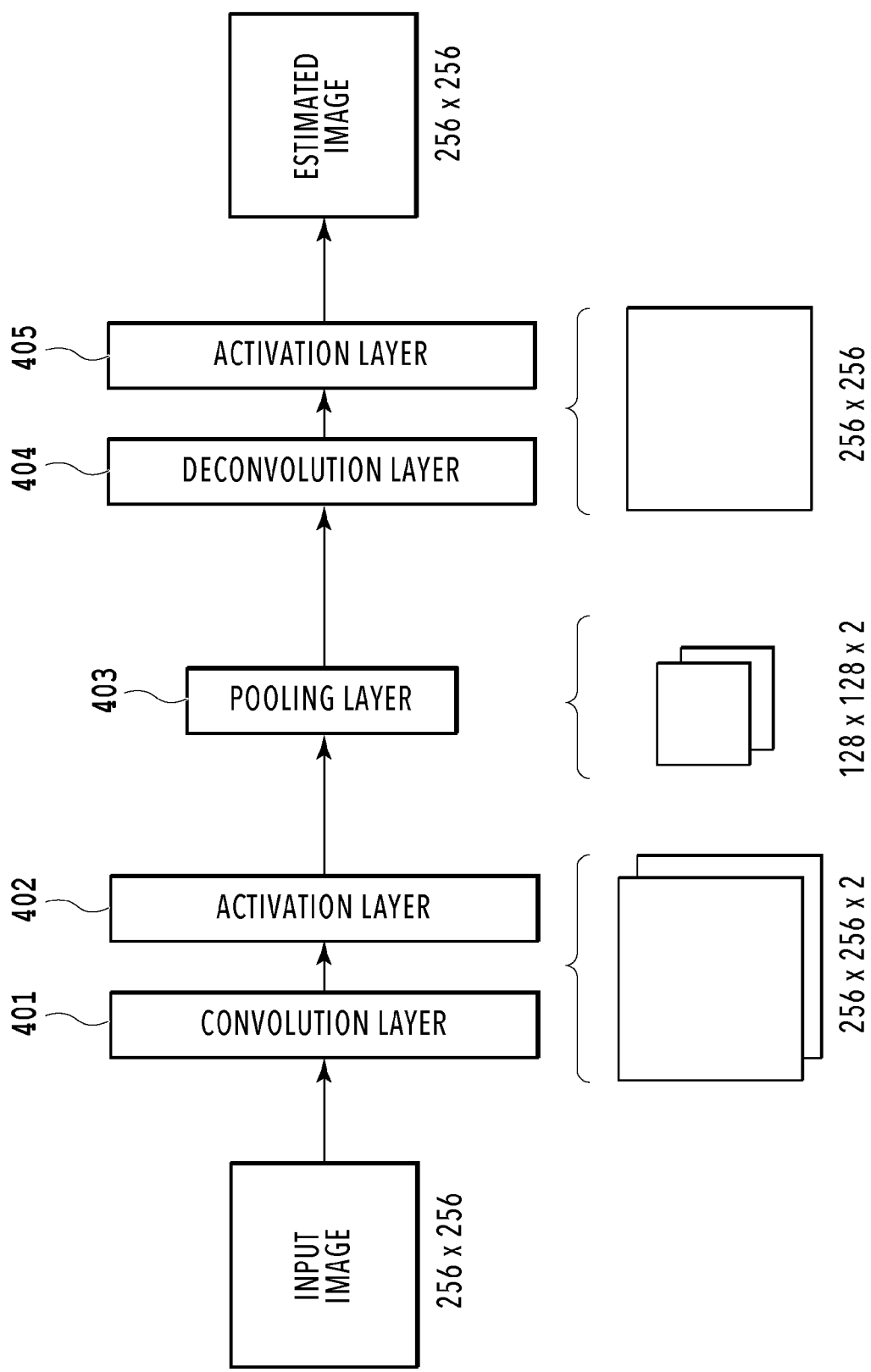
FIG. 4 is a schematic diagram showing a configuration of a first estimation unit.

A configuration of the first estimation unit 203 will be described below. FIG. 4 shows an example configuration of the neural network in the first estimation unit 203. Although the process in the present embodiment will be described below based on the neural network shown in FIG. 4, the technique of the present disclosure is not limited to it. For example, a neural network with a larger number of layers may be employed, or a U-net architecture may be employed. Also, in the present embodiment, 256 pixel×256 pixel monochrome image data is the input, but the technique of the present disclosure is not limited to it. A case where CMYK image data is the input will be described in detail in embodiment 2.

First, a convolution layer 401 performs convolution operation on the input image data inputted into the first estimation unit 203. For the pixel value of the input image data at a position (x, y) being I(x, y), output image data $I_{G1}(x, y, p)$ from the convolution layer 401 is calculated by the equation below.

[Math. 1]

$$I_{G1}(x,y,p)=\sum_{s=-1}^{s=1}\sum_{t=-1}^{t=1}w_{stp}^{(G1)}I(x+s,y+t) \quad (1)$$

Here, p is the number of output planes, and p=2 in the present embodiment.

Also, $$w_{stp}^{(G1)}$$ [Math. 2]

is a weight held in the neural network at the convolution layer 401, and has a value that varies by the combination of s, t, and p. Note that as for I(x+s, y+t) in the above equation, in a case where the referred position is outside the positions of the pixels included in the input image data (e.g., I(−1, −1) or the like), the operation is performed with 0 as the pixel value. By the above operation, the output of the convolution layer 401 is 256×256×2 image data.

Then, an activation layer 402 applies a non-linear function to the output image data $I_{G1}(x, y, p)$ from the convolution layer 401. Specifically, output image data $I_{G2}(x, y, p)$ from the activation layer 402 is calculated by the equation below using the ramp function.

$$I_{G2}(x,y,p)=\max(0,I_{G1}(x,y,p))$$ [Math. 3]

Note that the non-linear function applied in this process is not limited the above function. In an example, a hyperbolic tangent function or the like may be used. By the above operation, the output image data $I_{G2}(x, y, p)$ from the activation layer 402 is 256×256×2 image data, that is, image data with two planes each including 256×256 image data.

Then, a pooling layer 403 performs information compression. Here, 2×2 max pooling is performed to compress the output image data $I_{G2}(x, y, p)$. Specifically, output image data $I_{G3}(u, v, p)$ from the pooling layer 403 is calculated by the equation below.

$$I_{G3}(u,v,p)=\max(I_{G2}(2u,2v,p),$$

$$I_{G2}(2u,2v+1,p),I_{G2}(2u+1,2v,p),I_{G2}(2u+1,2v+1,p))$$ [Math. 4]

Note that the ranges of u and v are 0≤u≤127 and 0≤v≤127, respectively. By the above operation, the output image data $I_{G3}(u, v, p)$ from the pooling layer 403 is 128×128×2 image data.

Then, a deconvolution layer 404 expands the output image data $I_{G3}(u, v, p)$. In this process, the output image data $I_{G3}(u, v, p)$ from the pooling layer 403 is partially expanded and then convolution operation is performed across the planes. First, the expansion of the output image data $I_{G3}(u, v, p)$ from the pooling layer 403 is performed through the procedure below.

$$I_T(2u,2v,p)=I_{G3}(u,v,p)$$

$$I_T(2u,2v+1,p)=0$$

$$I_T(2u+1,2v,p)=0$$

$$I_T(2u+1,2v+1,p)=0$$ [Math. 5]

Then, using the equation below, the deconvolution layer 404 performs convolution operation with $I_T(x, y, p)$ obtained by the above expansion process as an input.

$$I_{G4}(x,y)=\sum_{s=-1}^{s=1}\sum_{t=-1}^{t=1}\sum_{p=1}^{p=2}w_{stp}^{(G4)}I_T(x+s,y+t,p)$$ [Math. 6]

Here, $$w_{stp}^{(G4)}$$ [Math. 7]

is a weight held in the neural network at the deconvolution layer 404, and differs from the weight used at the convolution layer 401. Note that as for $I_T(x+s, y+t, p)$ in the above equation, in a case where the referred position is outside the image (e.g., $I_T(-1, -1, 1)$ or the like), the operation is performed with 0 as the pixel value. By the above operation, output image data $I_{G4}(x, y)$ from the deconvolution layer 404 is 256×256 image data.

Then, an activation layer 405 applies a non-linear function to the output of the convolution layer 404. The steps in this process is similar to that of the activation layer 402, but the non-linear function is not necessarily the same as that of the activation layer 402.

<Process in Second Estimation Unit 204>

The process in the second estimation unit 204 will be described below. The second estimation unit 204 includes a neural network and its process is similar to that of the first estimation unit 203. However, the network configuration of the neural network and its weights do not necessarily have to be the same as those of the first estimation unit 203.

<Configuration and Process of First Learning Unit 206>

In the present embodiment, the first learning unit 206 causes the first estimation unit 203 to perform learning by using a generative adversarial network (GAN) framework. In the present embodiment, a model is learned which receives a combination of learning input image data and correct data and minimizes the output image error from the first estimation unit 203, that is, the difference between the learning input image data and the correct data. Here, the learning input image data is a binary image data set prepared as a database for learning in advance and obtained by performing halftoning on multi-tone image data. Also, as the correct data, learning intermediate data is used which is calculated based on a scanned image data set obtained by scanning printing results obtained by printing the learning input image data set with the modeling-target printer and print medium. The learning intermediate data is obtained by binarizing the scanned image data and is image data with no blur containing information on the state of scattering or bleeding of the color material. A specific method of calculating the learning intermediate data will be described later.

Figure 5:
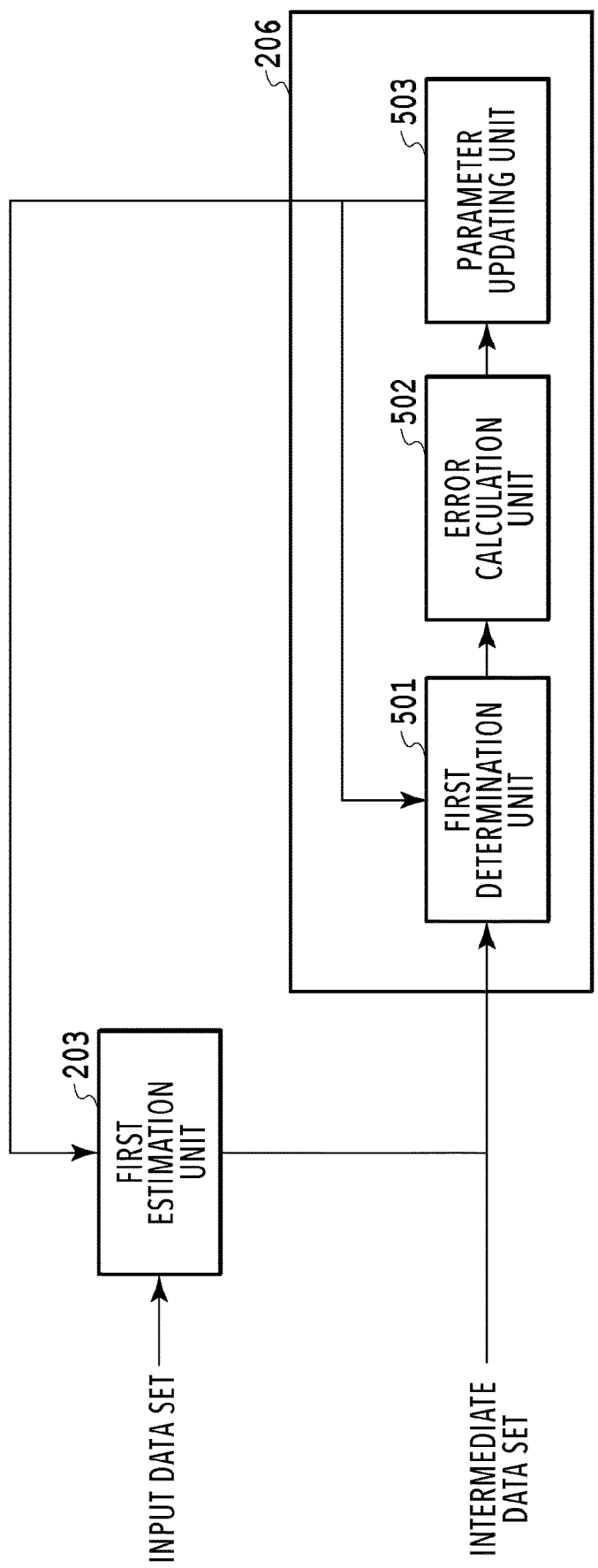
FIG. 5 is a schematic diagram showing processing steps in a first learning unit.

FIG. 5 shows an example configuration of the first learning unit 206. The first estimation unit 203, which is the learning target, calculates intermediate data for input image data.

A first determination unit 501 determines whether image data inputted into the first learning unit 206 is correct data or intermediate data outputted by the first estimation unit 203. The first determination unit 501 is a determiner for learning the parameters of the first estimation unit 203 and includes a neural network. The first determination unit 501 returns 1 if determining that the inputted image data is the correct data, and returns 0 if determining that the inputted image data is the intermediate data outputted by the first estimation unit 203. A configuration of the first determination unit 501 will be described later.

Based on the result of the determination by the first determination unit 501 on the image data inputted into the first learning unit 206, an error calculation unit 502 calculates the error between the intermediate data outputted by the first estimation unit 203 and the correct data.

A parameter updating unit 503 updates the parameters of the first estimation unit 203 and the first determination unit 501 based on the error calculated by the error calculation unit 502.

<Configuration of First Determination Unit 501>

Figure 6:
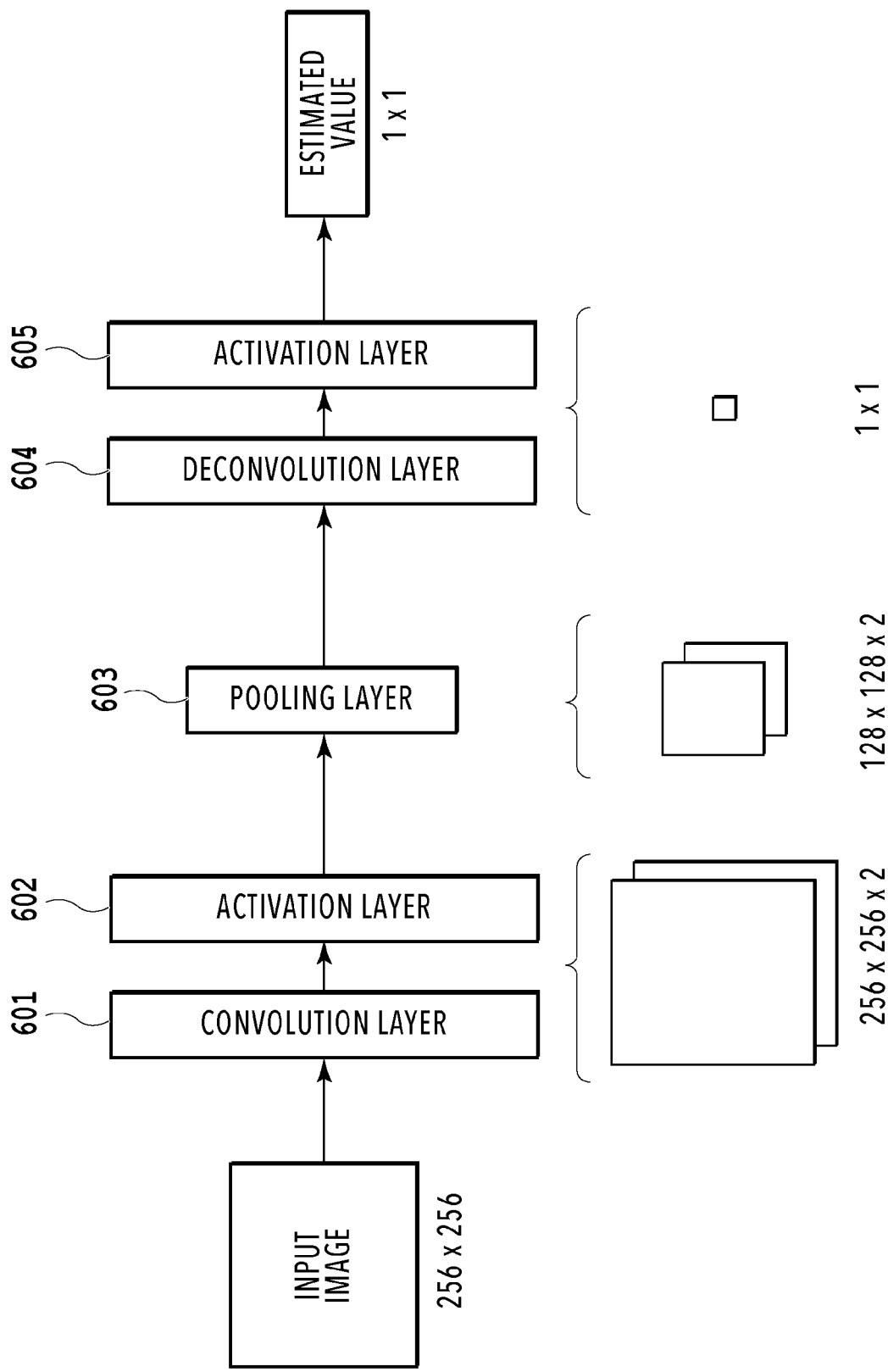
FIG. 6 is a schematic diagram showing a configuration of a first determination unit.

A configuration of the first determination unit 501 will be described below. FIG. 6 shows an example configuration of the neural network in the first determination unit 501. Although the process in the present embodiment will be described below based on the neural network shown in FIG. 6, the technique of the present disclosure is not limited to it. For example, a neural network with a larger number of layers may be employed, or a U-net architecture may be employed. Also, in the present embodiment, 256×256 monochrome image data is the input, but the technique of the present disclosure is not limited to it.

First, a convolution layer 601 performs convolution operation on the inputted image data. This process is similar to that of the convolution layer 401, and output image data $I_{D1}(x, y, p)$ outputted from the convolution layer 601 is calculated by the equation below.

$$I_{D1}(x, y, p) = \sum_{s=-1}^{s=1} \sum_{t=-1}^{t=1} w_{stp}^{(D1)} I(x+s, y+t)$$ [Math. 8]

Then, an activation layer 602 applies a non-linear function to the output image data $I_{D1}(x, y, p)$ from the convolution layer 601 and outputs output image data $I_{D2}(x, y, p)$. This process is similar to that of the activation layer 402.

Then, a pooling layer 603 performs information compression and outputs output image data $I_{D3}(x, y, p)$. This process is similar to that of the pooling layer 403.

Then, a full connected layer 604 calculates a v value, which is a single numerical value, from the output image data $I_{D3}(x, y, p)$ from the pooling layer 603. The v value outputted by the full connected layer 604 is calculated by the equation below.

$$v = \sum_{x=1}^{x=127} \sum_{y=1}^{y=127} \sum_{p=1}^{p=2} w_{xyp}^{(D4)} I_{D3}(x, y, p)$$ [Math. 9]

Here, $$w_{xyp}^{(D4)}$$ [Math. 10]

is a weight held in the neural network.

Lastly, an activation layer 605 performs a non-linear process on the v value and outputs an O value as a determination result. Here, the sigmoid function is applied to convert the v value into an O value in a range [0, 1].

<Process in First Learning Unit 206>

Figure 7:
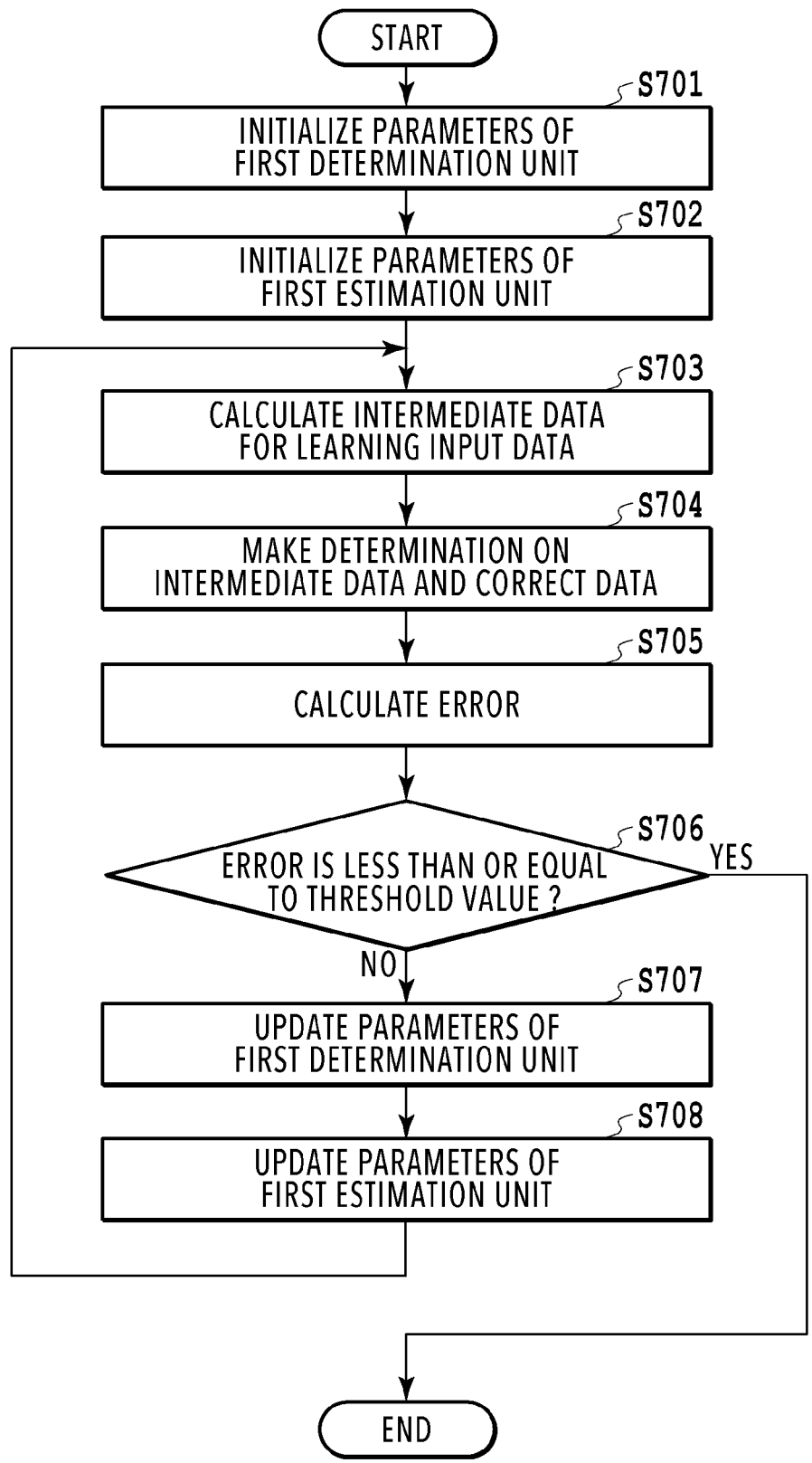
FIG. 7 is a flowchart showing processing steps in a learning process by the first learning unit.

Specific process in the first learning unit 206 will be described using a flowchart in FIG. 7.

In step S701, each parameter of the first determination unit 501 is initialized. In the present embodiment, a random number based on a normal distribution is determined as the initial values of the parameter.

In step S702, each parameter of the first estimation unit 203 is initialized. In the present embodiment, a random number based on a normal distribution is determined as the initial values of the parameter.

In step S703, intermediate data estimated by using the first estimation unit 203 is obtained for each piece of learning input image data. The intermediate data obtained in this step is $Est_m(1 \leq m \leq M)$. Here, M is the number of pieces of input data.

In step S704, a determination is made on each of the intermediate data $Est_m$ and correct data $Ref_m(1 \leq m \leq M)$ by using the first determination unit 501. The determination result of the intermediate data $Est_m$ is $$O_m^{est} \quad \text{[Math. 11]}$$

and the determination result of the correct data $Ref_m$ is $$O_m^{ref} \quad \text{[Math. 12]}$$

In step S705, an error e is calculated based on the determination results in S704 and the intermediate data and the correct data. In the present embodiment, the error e is defined by the equation below.

$$e = \frac{1}{M} \sum_{m=1}^{M} \{\log(O_m^{ref}) + \log(1 - O_m^{est}) + \lambda \|Ref_m - Est_m\|_1\} \quad \text{[Math. 13]}$$

Here, $\|Ref_m - Est_m\|_1$ is the L1 norm between the intermediate data and the correct data. Also, λ is a coefficient of the regularization term, and λ=0.1 in the present embodiment.

In step S706, whether or not the error is less than or equal to a threshold value is determined. If the error is not less than or equal to the threshold value, the process proceeds to step S707. Otherwise, the process is terminated.

In step S707, the parameters of the first determination unit 501 are updated. The update is performed by a gradient method. Assuming that the parameters of the first determination unit 501, i.e., the weight of the convolution layer 601 and the weight of the full connected layer 604, are $$\theta_d = \{w^{(D1)}, w^{(D4)}\} \quad \text{[Math. 14]}$$

the parameters are updated by the conversion below.

$$\theta_d \leftarrow \theta_d + \gamma \nabla_{\theta_d} e \quad \text{[Math. 15]}$$

Here, γ is a learning coefficient, and γ=0.01 in the present embodiment. Also, $$\nabla_{\theta_d} e \quad \text{[Math. 16]}$$

is a partial derivative of the error e with each parameter, and may be calculated by automatic differentiation.

In step S708, the parameters of the first estimation unit 203 are updated. The update is performed by a gradient method. Assuming that the parameters of the first estimation unit 203, i.e., the weight of the convolution layer 401 and the weight of the deconvolution layer 404, are $$\theta_g = \{w^{(G1)}, w^{(G4)}\} \quad \text{[Math. 17]}$$

the parameters are updated by the conversion below.

$$\theta_g \leftarrow \theta g + \delta \nabla_{\theta_g} e \quad \text{[Math. 18]}$$

Here, δ is a learning coefficient, and δ=0.01 in the present embodiment. Also, $$\nabla_{\theta_g} e \quad \text{[Math. 19]}$$

is a partial differential value of the error e with each parameter, and may be calculated by automatic differentiation. After the parameters of the first estimation unit 203 are updated in step S708, the process returns to step S703.

The parameters of the first determination unit 501 and the first estimation unit 203 are repeatedly updated as described above until the error e falls to or below the predetermined threshold value.

<Process in Learning Intermediate Data Obtaining Unit 208>

The first learning unit 206 uses learning intermediate data calculated from scanned image data as correct data. The learning intermediate data is obtained by binarizing the scanned image data and is image data with no blur representing the state of scattering or bleeding of the color material. In the present embodiment, the scanned image data is binarized by using a threshold value th. Specifically, for inputted scanned image data I(x, y), its binarized image data B(x, y) can be calculated by the equation below.

$$B(x, y) = \begin{cases} 0 & (I(x, y) < th) \\ 1 & (I(x, y) \geq th) \end{cases} \quad \text{[Math. 20]}$$

Note that the threshold value th may be determined by using Otsu's method, for example.

<Configuration and Process of Second Learning Unit 207>

In the present embodiment, the second learning unit 207 causes the second estimation unit 204 to perform learning by using a GAN framework. In the present embodiment, a model is learned which receives a combination of learning input image data and correct data and minimizes the output image error from the second estimation unit 204, that is, the difference between the learning input image data and the correct data. Here, the learning input image data is the learning intermediate data calculated by the learning intermediate data obtaining unit 208. Also, as the correct data, a scanned image data set obtained by scanning printing results obtained by printing the learning input image data set with the modeling-target printer and print medium.

Figure 8:
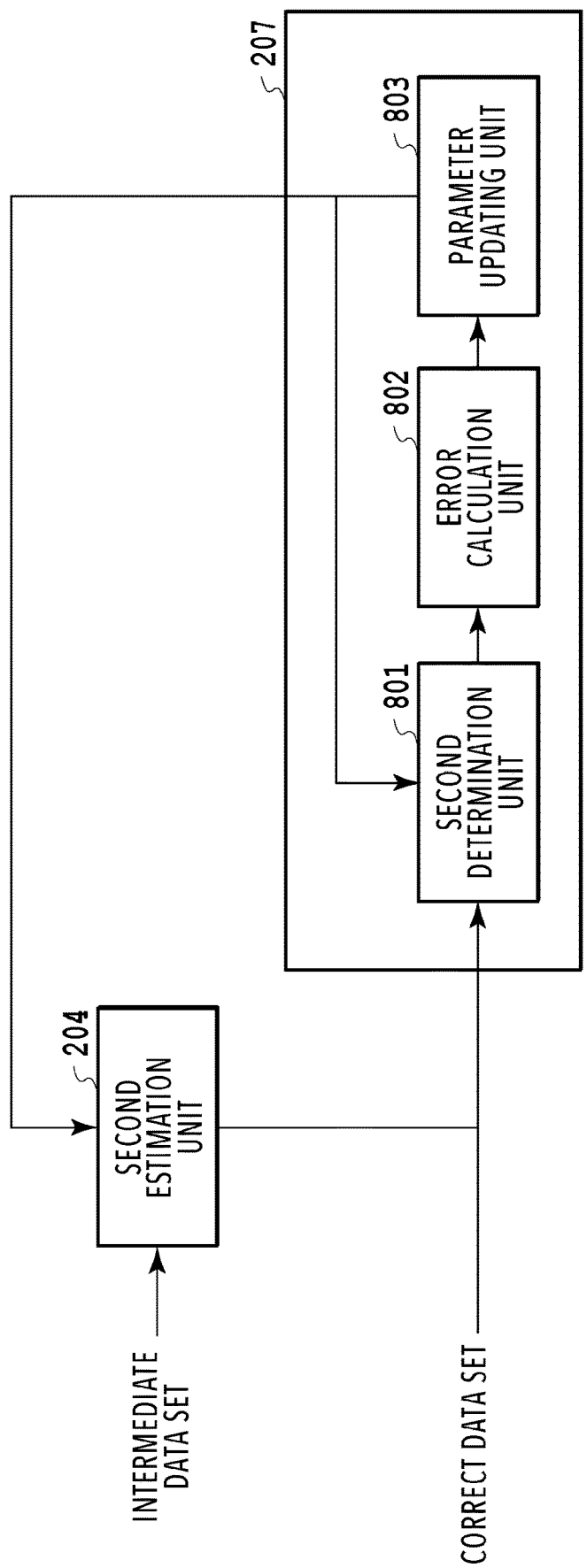
FIG. 8 is a schematic diagram showing processing steps in a second learning unit.

FIG. 8 shows an example configuration of the second learning unit 207. The second estimation unit 204, which is the learning target, calculates estimated image data for inputted intermediate data.

The second determination unit 801 is a determiner that determines whether an inputted image is scanned image data, which is correct data, or the estimated image data outputted by the second estimation unit 204. The second determination unit 801 is a determiner for learning the parameters of the second estimation unit 204 and includes a neural network. The second determination unit 801 returns 1 if determining that the inputted image data is the correct data, and returns 0 if determining that the inputted image data is the estimated image data outputted by the second estimation unit 204. The configuration and process of the second determination unit 801 are similar to those of the first determination unit 501.

An error calculation unit 802 calculates an error based on the result of the determination by the second determination unit 801 on the estimated image data outputted by the second estimation unit 204 and the correct data.

A parameter updating unit 803 updates the parameters of the second estimation unit 204 and the second determination unit 801 based on the error calculated by the error calculation unit 802. Note that the process in the second learning unit 207 is similar to that of the first learning unit 206.

In the present embodiment, a method of estimating a printed image by using neural networks has been discussed above. In the present embodiment, the learning requires a relatively large amount of operation. However, in the estimation, an image is estimated with a small amount of operation such as filter operation. Also, by using two independent neural networks for the image estimation, an accurate image with high fidelity to the actual image is estimated.

Embodiment 2

In embodiment 1, a discussion has been given of a method of accurately estimating scanned image data of a printing result by using two neural networks, i.e., the first estimation unit 203 and the second estimation unit 204. Here, since the two neural networks need to be learned, the amount of operation for the learning is large. In view of this, in embodiment 2, a discussion will be given of a method of estimating scanned image data of a printing result with a single neutral network by simplifying the image estimation processing unit 202. The present embodiment is suitable for modeling a suitable printer with which the scattering or bleeding of a color material is small. Also, in embodiment 1, input image data is 1-plane 1-bit image data. However, in the present embodiment, input image data is 4-plane 1-bit image data corresponding to CMYK image data obtained by performing halftoning on multi-tone image data. Also, a discussion will be given of an embodiment in which estimated image data is 3-plane 8-bit image data corresponding to RGB image data. Note that only the difference from embodiment 1 will be described below.

<Process in Image Processing Apparatus>

Figure 9:
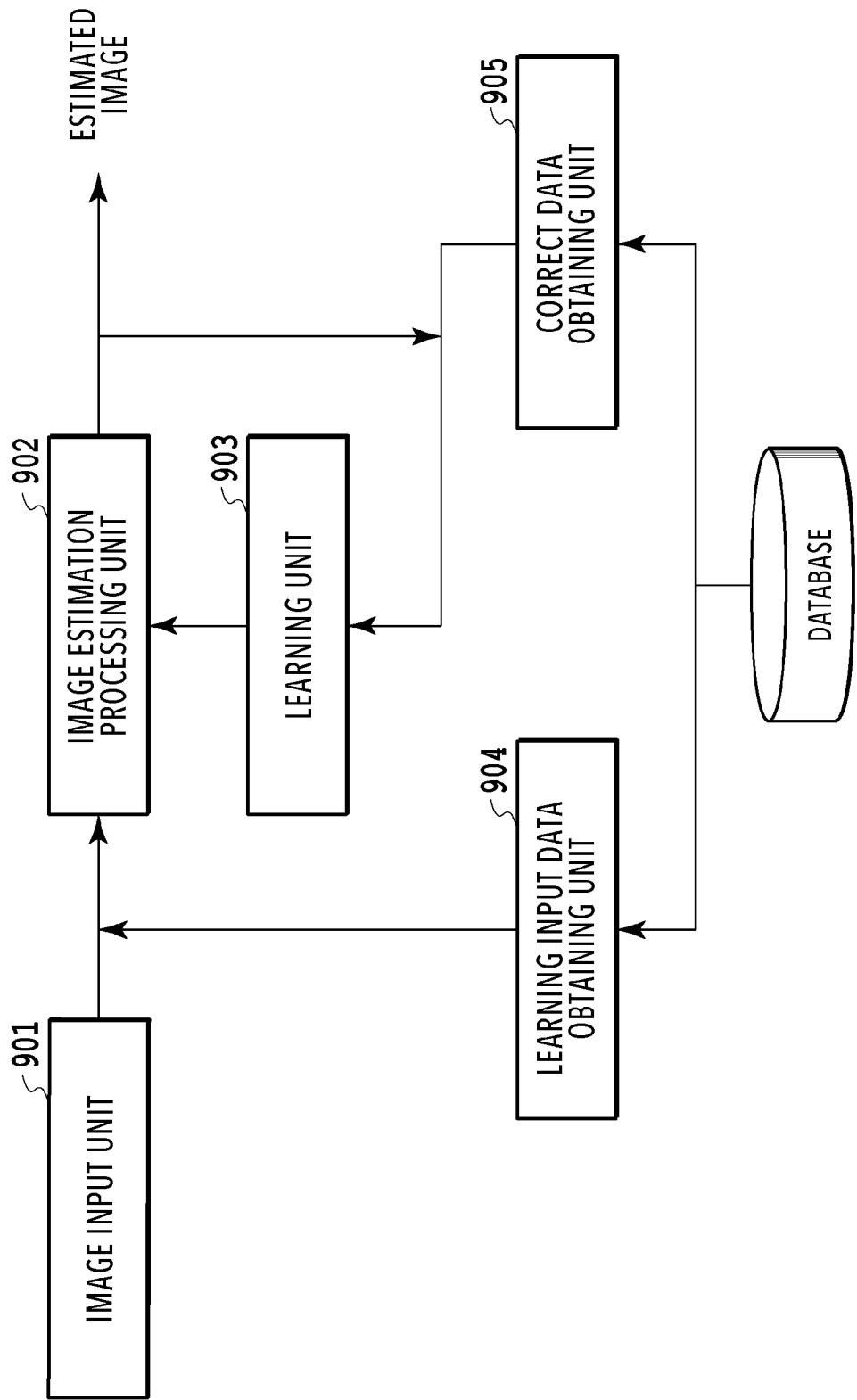
FIG. 9 is a block diagram showing processing steps in an image processing apparatus in embodiment 2.

FIG. 9 is a block diagram showing process in the present embodiment. An image input unit 901 obtains an input image. From the input image data obtained at the image input unit 901, an image estimation processing unit 902 estimates a printing result to be printed with a modeling-target printer and print medium. The image data inputted into the image estimation processing unit 902 is 4-plane 1-bit image data corresponding to CMYK image data obtained by performing halftoning on multi-tone image data. Also, the estimated image data outputted from the image estimation processing unit 902 is 3-plane 8-bit image data which is equivalent to scanned image data obtained by reading, with a scanner, the printing result printed with the printer and corresponds to RGB image data. Also, a learning unit 903 learns internal parameters of the image estimation processing unit 902.

The learning unit 903 causes the image estimation processing unit 902 to learn its internal parameters by using an input image data set obtained by a learning input data obtaining unit 904 and a scanned image data set obtained by a correct data obtaining unit 905.

Note that the image estimation processing unit 902 and the learning unit 903 may work as separate apparatuses. In an example, the learning unit 903 may learn the internal parameters of the image estimation processing unit 902 in advance and only the image estimation processing unit 902 may be used at the time of estimating an image.

<Configuration of Image Estimation Processing Unit 902>

Figure 10:
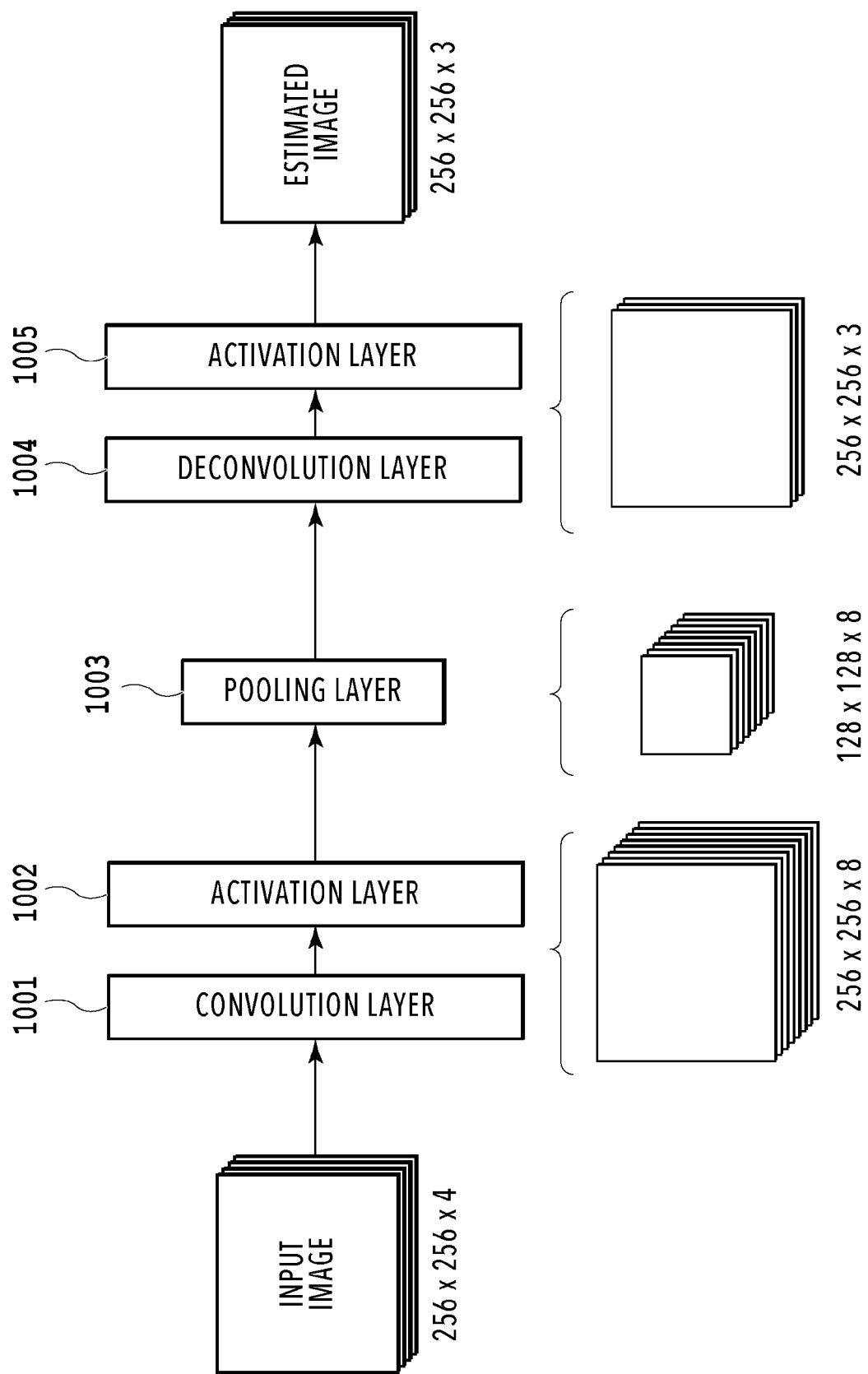
FIG. 10 is a schematic diagram showing a configuration of an image estimation processing unit in embodiment 2.

A configuration of the image estimation processing unit 902 in the present embodiment will be described below. Unlike in embodiment 1, the image estimation processing unit 902 includes a single neural network. FIG. 10 shows an example configuration of the neural network in the image estimation processing unit 902. Although the process in the present embodiment will be described below based on the neural network shown in FIG. 10, the technique of the present disclosure is not limited to it.

First, a convolution layer 1001 performs convolution operation on 256×256×4 input image data. For the pixel value of the input image data at a position (x, y) in a p plane being I(x, y, p1), output image data $I_{G1}$(x, y, p2) from the convolution layer 1001 is calculated by the equation below.

$$I_{G1}(x, y) = \sum_{p=1}^{p=4} \sum_{s=-1}^{s=1} \sum_{t=-1}^{t=1} w_{stpG1}^{(G1)} I(x+s, y+t, p1)$$ [Math. 21]

Here, p1 denotes the plane number of the input image and $1 \le p1 \le 4$. Also, p2 is the plane number of $I_{G1}$ and $1 \le p2 \le 8$. Also, $$w_{stpG1}^{(G1)}$$ [Math. 22]

is a weight held in the neural network. Note that as for I(x+s, y+t, p1) in the above equation, in a case where the referred position is outside the image (e.g., I(−1, −1, 1) or the like), the operation is performed with 0 as the pixel value. By the above operation, the output of the convolution layer 1001 is 256×256×8 image data.

The process in the activation layer 1002 is similar to that of the activation layer 402.

A pooling layer 1003 performs information compression. Here, 2×2 max pooling is performed to compress the image. Specifically, output image data $I_{G3}$(u, v, p2) from the pooling layer 1003 is calculated as $$I_{G3}(u,v,p2) = \max(I_{G2}(2u,2v,p2),$$

$$I_{G2}(2u,2v+1,p2), I_{G2}(2u+1,2v,p2), I_{G2}(2u+1,2v+1,p2)$$ [Math. 23]

Note that the ranges of u and v are $0 \le u \le 127$ and $0 \le v \le 127$, respectively. By the above operation, the output of the pooling layer 1003 is 128×128×8 image data.

Then, a deconvolution layer 1004 expands the image. In this process, the output image from the pooling layer 1003 is partially expanded and then convolution operation is performed across the planes. First, the expansion of the output image data $I_{G3}$(u, v, p2) from the pooling layer 1003 is performed through the procedure below.

$$I_T(2u, 2v, p2) = I_{G3}$$

u, v, p2

$$I_T(2u, 2v+1, p2) = 0$$

$$I_T(2u+1, 2v, p2) = 0$$

$$I_T(2u+1, 2v+1, p2) = 0$$ [Math. 24]

Then, using the equation below, the deconvolution layer 1004 performs convolution operation with $I_T$ obtained by the above expansion process as an input.

$$I_{G4}(x, y, p3) = \sum_{s=-1}^{s=1} \sum_{t=-1}^{t=1} \sum_{p=1}^{p=2} w_{stpG4}^{(G4)} I_T(x+s, y+t, p2)$$ [Math. 25]

Here, $$w^{(G4)}_{stp_{G4}} \quad \text{[Math. 26]}$$

is a weight held in the neural network, and differs from the weight used at the convolution layer 1001. Also, p3 is the plane number of $I_{G4}$ and $1 \le p3 \le 3$. Note that as for $I_7(x+s, y+t, p2)$ in the above equation, in a case where the referred position is outside the image (e.g., $I_7(-1, -1, 1)$ or the like), the operation is performed with 0 as the pixel value. By the above operation, the deconvolution layer 1004 outputs a 256×256×3 image.

The process in the activation layer 1005 is similar to that of the activation layer 405.

By the above process, the 256×256×4 CMYK input image is converted into a 256×256×3 RGB image.

<Configuration of Learning Unit 903>

The learning unit 903, which learns the internal parameters of the image estimation processing unit 902, will be described below. In the present embodiment, as in embodiment 1, the learning unit 903 learns the internal parameters of the image estimation processing unit 902 by using a GAN framework. The input data is a learning input image data set prepared as a database for learning in advance, including 4-plane 1-bit image data corresponding to CMYK image data obtained by performing halftoning on multi-tone image data. Also, the correct data is a scanned image data set including 8-bit image data corresponding to RGB image data obtained by printing the learning input image data set with the modeling-target printer and print medium and reading each printing result with the scanner. In the present embodiment, unlike embodiment 1, intermediate data is not used in the learning. That is, the image estimation processing unit 902 in the present embodiment learns the estimation of scanned image data from input image data directly via a single neural network.

Figure 11:
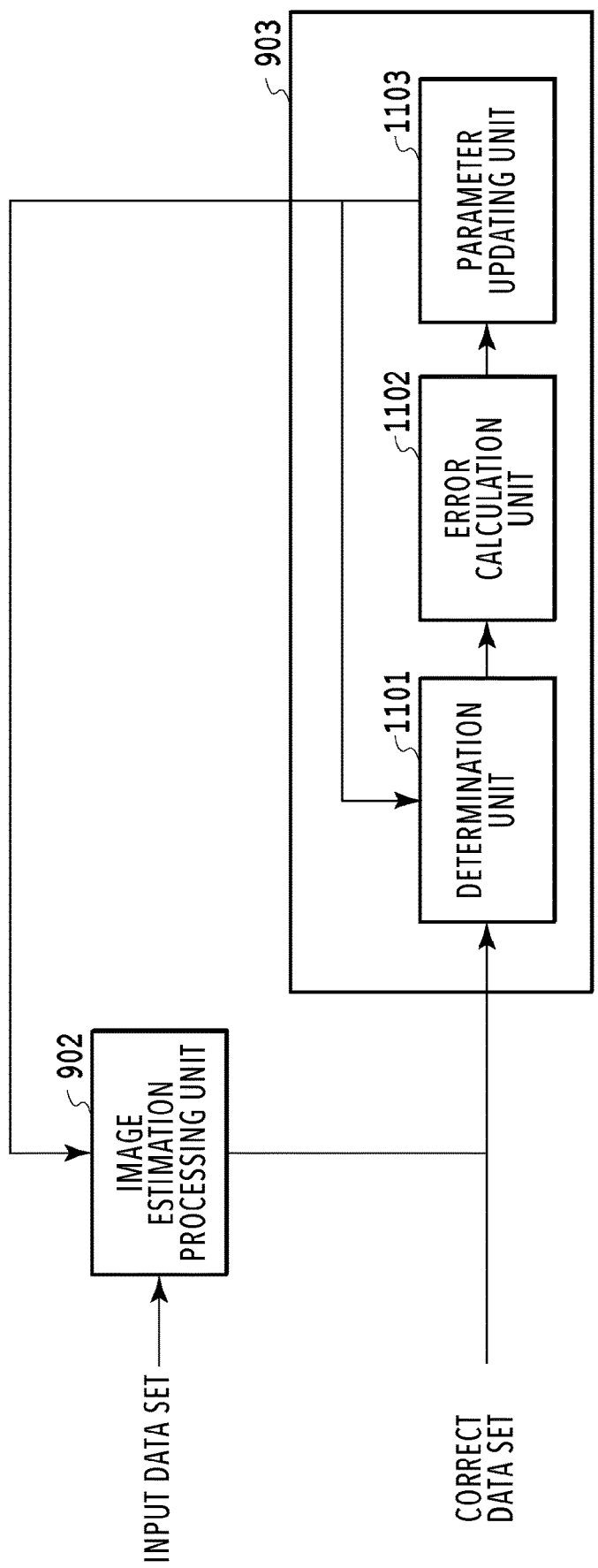
FIG. 11 is a schematic diagram showing processing steps in a learning unit in embodiment 2.

FIG. 11 shows an example configuration of the learning unit 903. The image estimation processing unit 902, which is the learning target, calculates an estimated image as scanned image data estimated from input image data.

A determination unit 1101 determines whether inputted image data is the correct data or the estimated image data outputted by the image estimation processing unit 902. The determination unit 1101 returns 1 if determining that the inputted image data is the correct data, and returns 0 if determining that the inputted image data is the estimated image data outputted by the image estimation processing unit 902. A configuration of the determination unit 1101 will be described later.

An error calculation unit 1102 calculates an error based on the result of the determination by the determination unit 1101 on the estimated image and the correct image. A parameter updating unit 1103 updates the parameters of the image estimation processing unit 902 and the determination unit 901 based on the error calculated by the error calculation unit 1102. Note that the process in the learning unit 902 in the present embodiment is similar to that of the first learning unit 201 in embodiment 1.

<Configuration of Determination Unit 1101>

Figure 12:
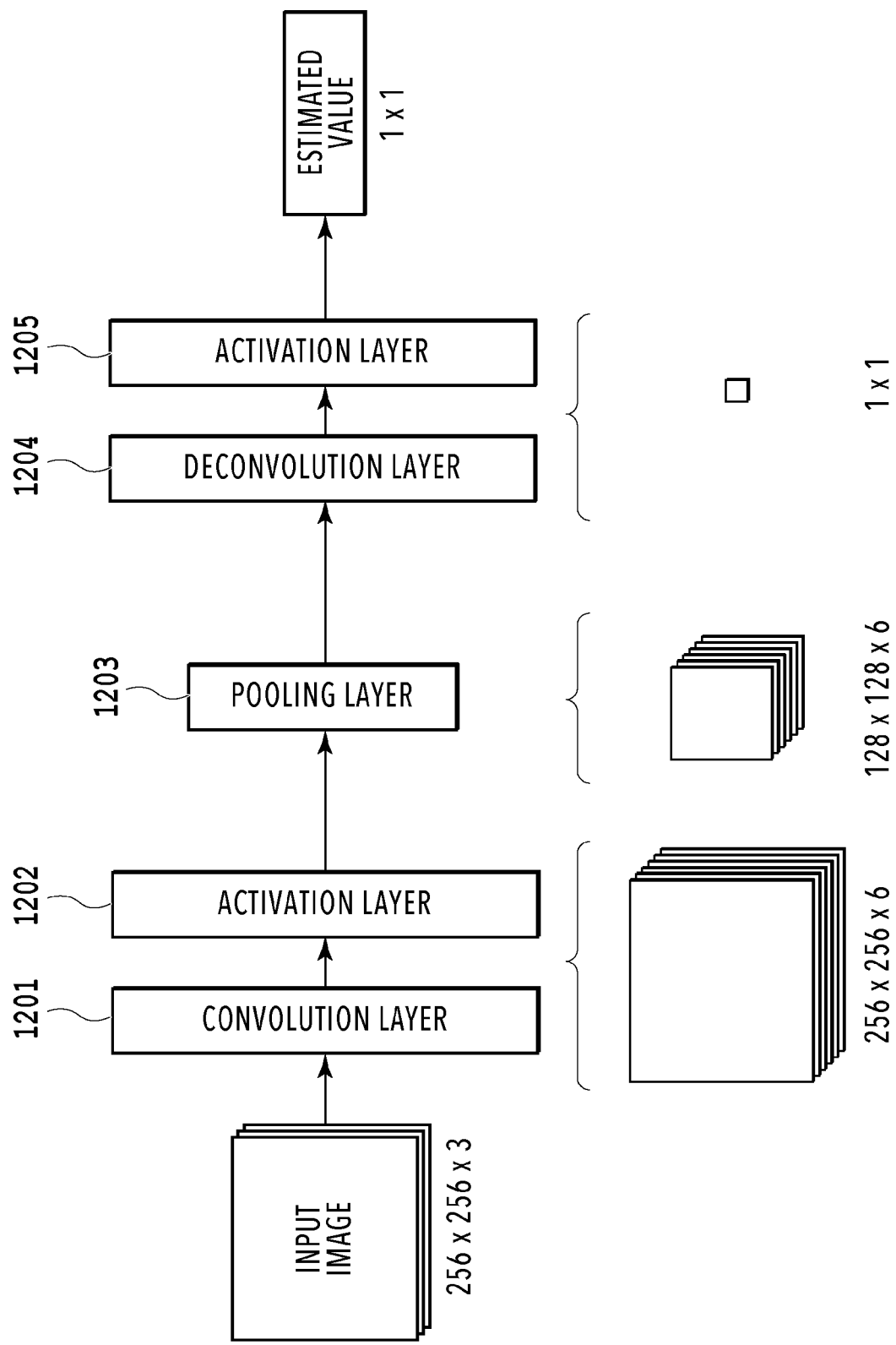
FIG. 12 is a schematic diagram showing a configuration of a determination unit in embodiment 2.

A configuration of the determination unit 1101 will be described below. FIG. 12 shows an example configuration of the neural network in the determination unit 1101. Although the process in the present embodiment will be described below based on the neural network shown in FIG. 12, the technique of the present disclosure is not limited to it.

First, a convolution layer 1201 performs convolution operation on the inputted 3-plane image data and outputs output image data $I_{D1}(x, y, p4)$. Here, p4 is the plane number of ID and $1 \le p4 \le 6$. Then, an activation layer 1202 performs a non-linear process on the output image data $I_{D1}(x, y, p4)$ and outputs output image data $I_{D2}(x, y, p4)$. Thereafter, a pooling layer 1203 performs information compression on the output image data $I_{D2}(x, y, p4)$ and outputs output image data $I_{D3}(x, y, p4)$. These processes are similar to the processes by the convolution layer 1001, the activation layer 1002, and the pooling layer 1003.

Then, a full connected layer 1204 calculates a v value, which is a single numerical value, from the output image data $I_{D3}(x, y, p4)$ from the pooling layer 1203. The v value outputted by the full connected layer 1204 is calculated by the equation below.

$$v = \sum_{x=1}^{x=127} \sum_{y=1}^{y=127} \sum_{p4=1}^{p4=6} w^{(D4)}_{xyp} I_{D3}(x, y, p4) \quad \text{[Math. 27]}$$

Here, $$w^{(D4)}_{xyp} \quad \text{[Math. 28]}$$

is a weight held in the neural network.

Lastly, an activation layer 1205 performs a non-linear process on the v value and outputs an O value as a determination result. This process is similar to that by the activation layer 605.

In the above embodiment, a method of obtaining an estimated image by using a single neural network has been described. According to the present embodiment, the amount of operation for the learning is reduced.

Embodiment 3

In embodiment 1, two estimation units are used which are a first estimation unit that reproduces the scattering or bleeding of the color material and a second estimation unit that estimates a printing result from information on the scattering or bleeding of the color material. Here, there are cases where only the information on the scattering or bleeding of the color material is desired to be known, such as a case of estimating the stability of the printer, for example. In view of this, in embodiment 3, a description will be given of an embodiment in which only the first estimation unit is used to output only intermediate data. Only the difference from embodiment 1 will be described below.

<Process in Image Processing Apparatus>

Figure 13:
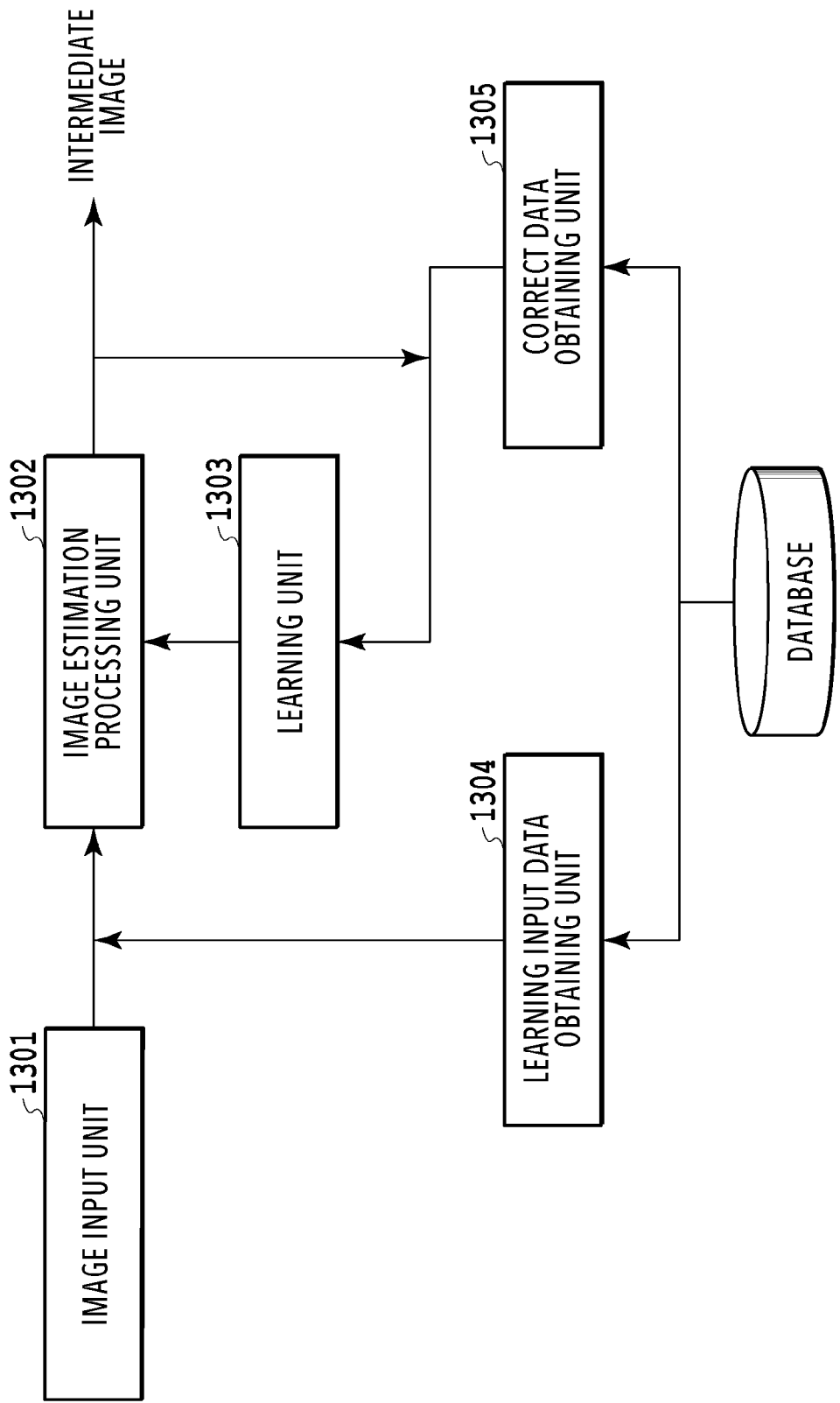
FIG. 13 is a block diagram showing processing steps in an image processing apparatus in embodiment 3.

FIG. 13 is a block diagram showing process in the present embodiment. An image input unit 1301 obtains input image data.

For the input image data, an image estimation processing unit 1302 estimates information on the scattering or bleeding of the color material in the printing of the image data with a modeling-target printer and print medium. The input of the image estimation processing unit 1302 is 1-bit monochrome image data obtained by performing halftoning on multi-tone image data. The output of the image estimation processing unit 1302 is 8-bit monochrome image data equivalent to scanned image data of the printing result.

Also, a learning unit 1303 learns internal parameters of the image estimation processing unit 1302. Note that the image estimation processing unit 1302 and the learning unit 1303 may process as separate apparatuses. In an example, the learning unit 1303 may learn the internal parameters of the image estimation processing unit 1302 in advance and only the image estimation processing unit 1302 may be used at the time of estimating an image.

The configuration of the image estimation processing unit 1302 is similar to that of the first estimation unit 203 in embodiment 1. Moreover, the configuration of the learning unit 1303 is similar to that of the first learning unit 206 in embodiment 1.

In the present embodiment, a description has been given of a method of estimating the degree of scattering or bleeding of the color material, instead of estimating the printing result. According to the present embodiment, the degree of scattering or bleeding of the color material is estimated with a small amount of learning operation.

Embodiment 4

In embodiments 1 to 3, estimated printed image data is calculated for inputted image data. In embodiment 4, a discussion will be given of an embodiment in which a display unit is further included and estimated image data is displayed to the user before printing. The difference from embodiment 2 will be discussed below.

<Process in Image Processing Apparatus>

Figure 14:
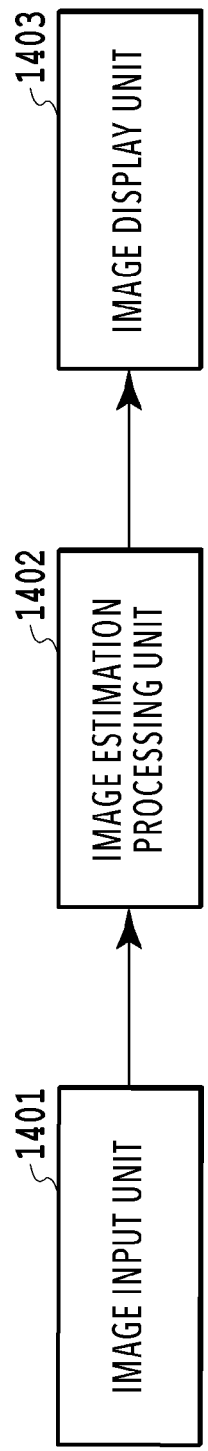
FIG. 14 is a block diagram showing processing steps in an image processing apparatus in embodiment 4.

FIG. 14 is a block diagram showing process in the present embodiment. An image input unit 1401 obtains input image data. Based on the input image data, an image estimation processing unit 1402 estimates a printing result to be printed with a modeling-target printer and print medium. The input into the image estimation processing unit 1402 is 4-plane 1-bit image data corresponding to CMYK image data obtained by performing halftoning on multi-tone image data. Also, the output of the image estimation processing unit 1402 is 3-plane 8-bit image data which is equivalent to scanned image data of the printing result and corresponds to RGB image data. Further, an image display unit 1403 presents this estimated image data to the user. Note that the configuration of the image estimation processing unit 1402 is similar to that in embodiment 2.

<Process in Image Display Unit 1403>

The image display unit 1403 receives the estimated image data, which is the output of the image estimation processing unit 1401. The image display unit 1403 then displays this estimated image data on the display 112 through the graphic accelerator 111 before printing.

Figure 15:
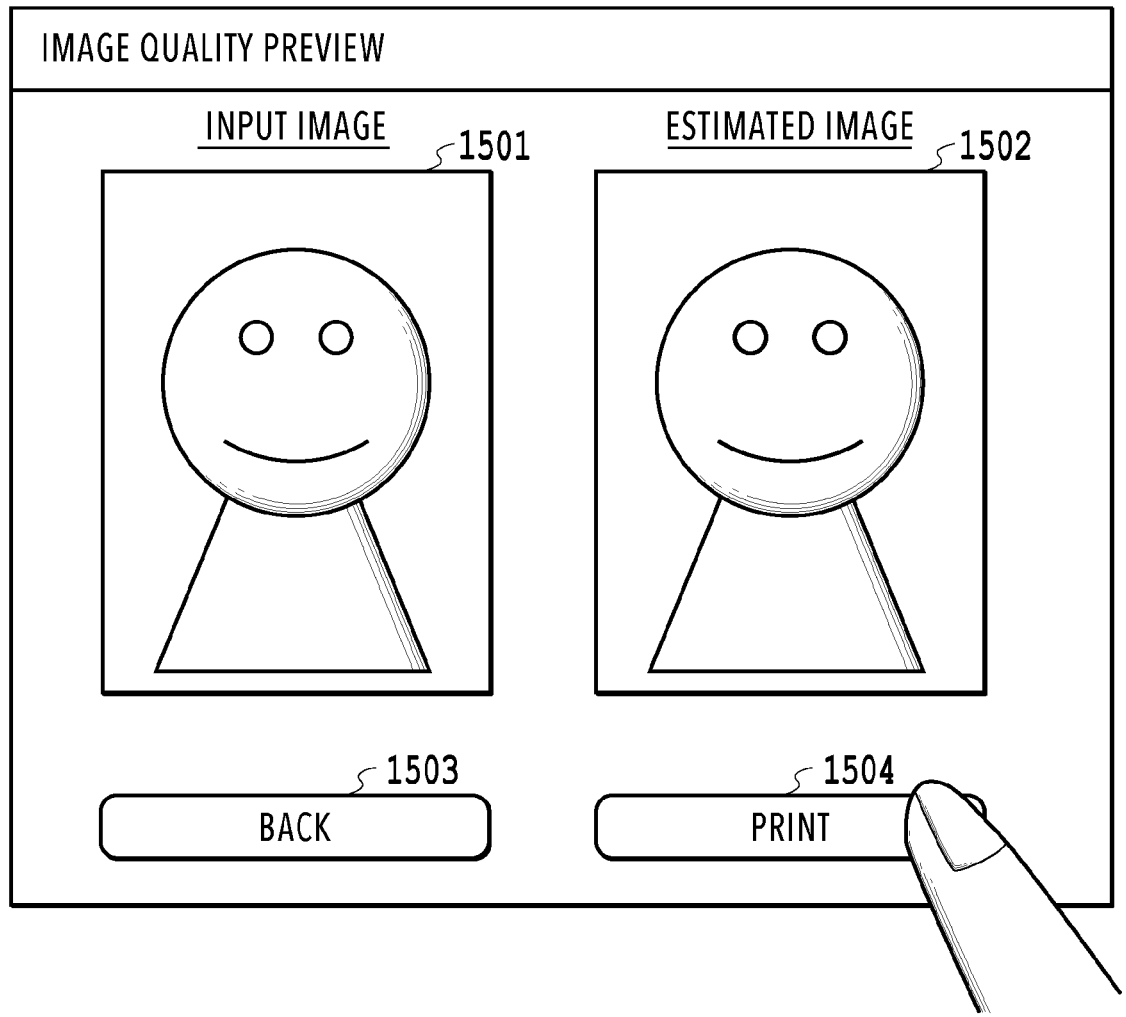
FIG. 15 is an application window displayed by an image display unit in embodiment 4.

FIG. 15 is an example of an application window displayed by the image display unit 1403. An input image display window 1501 displays the input image data. An estimated image display window 1502 displays the estimated image data, which is the output of the image estimation processing unit 1402. Meanwhile, the user can cancel the printing by pressing a button 1503. On the other hand, by pressing a button 1504, the process proceeds to the printing process on the input image data. Note that though not shown in FIG. 15, a button for selecting the print medium may be displayed to switch the estimated image data for each print medium.

In the present embodiment, a discussion has been given of a method in which a printing result is simulated and presented to the user before printing. According to the present embodiment, estimated image data of a printing result is displayed on a display apparatus before printing and the user can therefore check the printed image quality before the printing.

Note that the modeling targets are the printer and the print medium in embodiments 1 to 4, but only the printer or the print medium may be the modeling target. Also, the printer modeling may be performed by the printer type or by the printer.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

In the technique of the present disclosure, it is possible to estimate a printing result of image data to be printed with a small amount of operation after the image data is obtained.

This application claims the benefit of Japanese Patent Application No. 2019-095480 filed May 21, 2019, which is hereby incorporated by reference wherein in its entirety.

What is claimed is:

1. An image processing apparatus for estimating a printing result to be obtained by printing input image data with a printer, the image processing apparatus comprising:
    one or more memories storing instructions; and
    one or more processors executing the instructions to function as:
        an obtaining unit configured to obtain the input image data;
        an estimation unit configured to estimate, as the printing result, information on at least one of scattering or bleeding of a color material in the printing of the input image data with the printer based on the input image data;
        an intermediate data obtaining unit configured to obtain intermediate data generated from scanned image data;
        a first learning unit configured to, by using a combination of the input image data and the intermediate data associated with the input image data, cause a first estimator included in the estimator to perform learning; and a second learning unit configured to, by using a combination of the intermediate data and the scanned image data associated with the intermediate data, cause a second estimator included in the estimator and being different from the first estimator to perform learning, wherein the estimation unit has been caused to learn the scanned image data as correct data, the scanned image data being obtained by reading, with a scanner, a printing result obtained by printing an image data with the printer.

2. The image processing apparatus according to claim 1, wherein
the estimation unit comprises:
a first estimation unit configured to estimate intermediate data based on the input image data; and
a second estimation unit configured to estimate the printing result based on a result of the estimation by the first estimation unit.

3. The image processing apparatus according to claim 2, wherein the intermediate data is image data with a smaller number of tone levels than that of estimated image data outputted as the result of the estimation by the second estimation unit.

4. The image processing apparatus according to claim 2, wherein the intermediate data is image data indicating a region in the printing result in which a color material is applied at a predetermined density or higher.

5. The image processing apparatus according to claim 4, wherein the intermediate data is binary image data in which a single pixel is expressed by 1 bit.

6. The image processing apparatus according to claim 2, wherein the first estimation unit and the second estimation unit each comprise a neural network.

7. The image processing apparatus according to claim 1, further comprising a display configured to display estimated image data outputted by the estimation unit as a result of the estimation of the printing result.

8. The image processing apparatus according to claim 1, wherein the input image data is binary image data.

9. The image processing apparatus according to claim 1, wherein
the correct data is obtained by reading, with a scanner, a printing result obtained by printing a plurality of pieces of binary image data with the printer,
the plurality of pieces of binary image data are obtained by performing halftoning on a plurality of pieces of multi-tone image data, and
the plurality of pieces of multi-tone image data include pieces of image data with different numbers of tone levels.

10. A learning apparatus comprising:
one or more memories storing instructions; and
one or more processors executing the instructions to function as:
a first obtaining unit configured to obtain learning input image data;
a second obtaining unit configured to obtain scanned image data obtained by reading, with a scanner, a printing result obtained by printing the learning input image data with a printer;
a learning unit configured to, by using a combination of the learning input image data and the scanned image data, cause an estimator to perform learning, the estimator being configured to estimate a printing result to be obtained by printing input image data with the printer; and
an intermediate data obtaining unit configured to obtain intermediate data generated from the scanned image data, wherein the estimator estimates, as the printing result, information on at least one of scattering or bleeding of a color material in the printing of the input image data with the printer, and wherein the learning unit comprises:
a first learning unit configured to, by using a combination of the input image data and the intermediate data associated with the input image data, cause a first estimator included in the estimator to perform learning; and
a second learning unit configured to, by using a combination of the intermediate data and the scanned image data associated with the intermediate data, cause a second estimator included in the estimator and being different from the first estimator to perform learning.

11. The learning apparatus according to claim 10, wherein the intermediate data is obtained by converting the scanned image data into image data with a smaller number of tone levels than that of the scanned image data.

12. The learning apparatus according to claim 10, wherein the learning input image data and the input image data are binary image data.

13. The learning apparatus according to claim 10, wherein
the learning input image data is a plurality of pieces of binary image data obtained by performing halftoning on a plurality of pieces of multi-tone image data, and
the plurality of pieces of multi-tone image data include pieces of image data with different numbers of tone levels.

14. An image processing method of estimating a printing result to be obtained by printing input image data with a printer, comprising:
obtaining the input image data;
estimating, as the printing result, information on at least one of scattering or bleeding of a color material in the printing of the input image data with the printer based on the input image data;
obtaining intermediate data generated from scanned image data,
wherein estimation of the information is performed by an estimator that has been caused to learn the scanned image data as correct data, the scanned image data being obtained by reading, with a scanner, a printing result obtained by printing an image data with the printer, and
wherein causing the estimator to perform learning includes:
by using a combination of the input image data and the intermediate data associated with the input image data, causing a first estimator included in the estimator to perform learning; and
by using a combination of the intermediate data and the scanned image data associated with the intermediate data, causing a second estimator included in the estimator and being different from the first estimator to perform learning.

15. A learning method comprising:

obtaining learning input image data;

obtaining scanned image data obtained by reading, with a scanner, a printing result obtained by printing the learning input image data with a printer;

by using a combination of the learning input image data and the scanned image data, causing an estimator to perform learning, the estimator estimating a printing result to be obtained by printing input image data with the printer; and obtaining intermediate data generated from the scanned image data, wherein the estimator estimates, as the printing result, information on at least one of scattering or bleeding of a color material in the printing of the input image data with the printer, and wherein causing the estimator to perform learning includes:

by using a combination of the input image data and the intermediate data associated with the input image data, causing a first estimator included in the estimator to perform learning; and by using a combination of the intermediate data and the scanned image data associated with the intermediate data, causing a second estimator included in the estimator and being different from the first estimator to perform learning.

16. A non-transitory computer readable storage medium storing a program which causes a computer to execute an image processing method of estimating a printing result to be obtained by printing input image data with a printer, the image processing method comprising:

obtaining the input image data;

estimating, as the printing result, information on at least one of scattering or bleeding of a color material in the printing of the input image data with the printer based on the input image data;

obtaining intermediate data generated from scanned image data;

by using a combination of the input image data and the intermediate data associated with the input image data, causing a first estimator included in the estimator to perform learning; and by using a combination of the intermediate data and the scanned image data associated with the intermediate data, causing a second estimator included in the estimator and being different from the first estimator to perform learning, wherein estimation of the information is performed by an estimator that has been caused to learn scanned image data as correct data, the scanned image data being obtained by reading, with a scanner, a printing result obtained by printing an image data with the printer.

17. A non-transitory computer readable storage medium storing a program that causes a computer to perform a method comprising:

obtaining learning input image data;

obtaining scanned image data obtained by reading, with a scanner, a printing result obtained by printing the learning input image data with a printer;

by using a combination of the learning input image data and the scanned image data, causing an estimator to perform learning, the estimator estimating a printing result to be obtained by printing input image data with the printer;

obtaining intermediate data generated from scanned image data;

by using a combination of the input image data and the intermediate data associated with the input image data, causing a first estimator included in the estimator to perform learning; and by using a combination of the intermediate data and the scanned image data associated with the intermediate data, causing a second estimator included in the estimator and being different from the first estimator to perform learning, wherein the estimator estimates, as the printing result, information on at least one of scattering or bleeding of a color material in the printing of the input image data with the printer.

* * * * *